A. A. KLEIN.
AIR DRILLING MACHINE.
APPLICATION FILED NOV. 21, 1919.
1,366,125.
Patented Jan. 18, 1921.
2 SHEETS—SHEET 2.
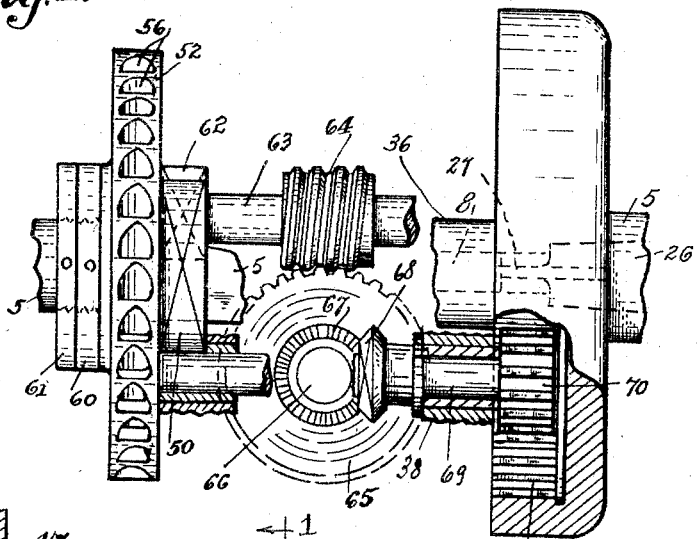
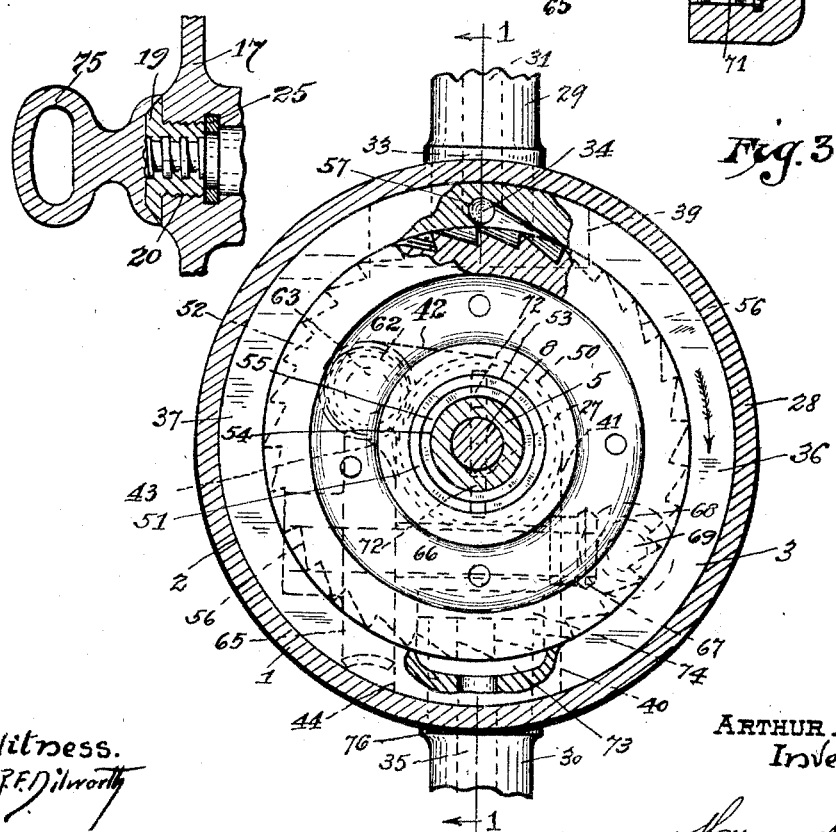
ARTHUR A. KLEIN.
Inventor.

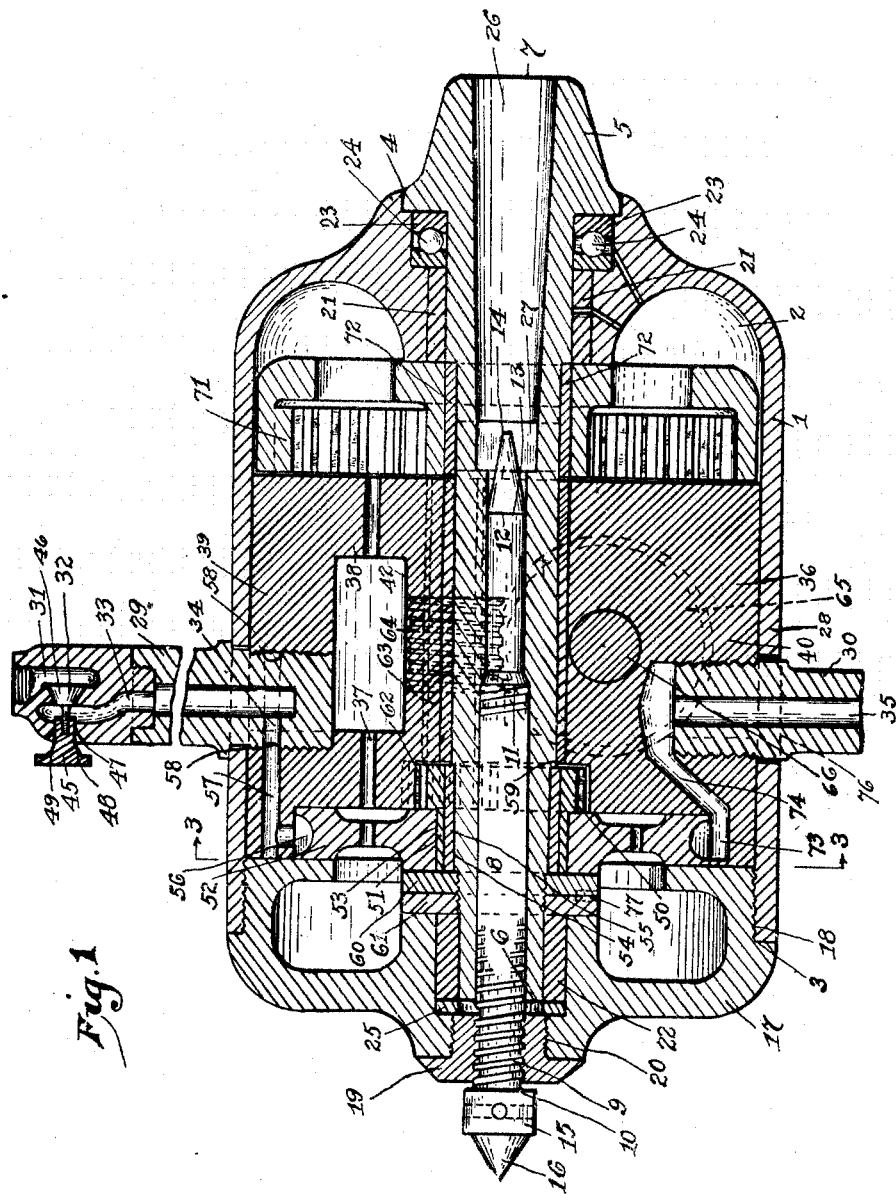

UNITED STATES PATENT OFFICE.

ARTHUR A. KLEIN, OF HOMESTEAD, PENNSYLVANIA.

AIR DRILLING-MACHINE.

1,366,125. Specification of Letters Patent. Patented Jan. 18, 1921.

Application filed November 21, 1919. Serial No. 339,712.

*To all whom it may concern:*

Be it known that I, ARTHUR A. KLEIN, a citizen of Hungary, formerly a part of the Austro-Hungarian Empire, residing at Homestead, in the county of Allegheny and State of Pennsylvania, have invented certain new and useful Improvements in Air Drilling-Machines, of which the following is a specification.

The present invention relates to air drilling machines and has for its object the provision of a new type of machine which by its convenient arrangement of working parts enables the device as a whole to produce considerably more power for its size than many of the machines in current use for drilling purposes. Its portability due to its compact form is also a distinct advantage. These and other advantages will be set out hereinafter in this specification.

In the accompanying drawings forming part of this specification I have illustrated one complete example of the physical embodiment of my invention constructed according to the best mode I have so far devised for the practical application of the principles of my invention.

Figure 1 of the drawings shows a central longitudinal section on line 1—1 of Fig. 3.

Fig. 2 shows a side view partly in section of the internal working parts of the device as seen from the right of Fig. 3.

Fig. 3 is a transverse section of the device on line 3—3 of Fig. 1.

Fig. 4 shows a form of handle adapted to be used in connection with the device in hand.

The numeral 1 indicates a shell of metal of preferably cylindrical shape, provided with an interior chamber 2, the latter being open at both ends 3 and 4. Passing through this chamber 2 is the drill spindle 5, which terminates at points 6 and 7. Within the said spindle 5 is revolubly located the feed screw 8 provided with a screw thread 9 preferably from points 10 to 11, continuing with a diminished diameter at 12 to point 13, and terminating in a frustum at 14. The feed screw at the end 10 is provided with a flattened or nut-like head 15 having a conical tapered end 16. The shell 1 is provided with a threaded shell or body cap 17, mounted on said shell at 18. Said cap is hollow and of circular shape preferably to suit the outer dimension of the shell 1 as shown. Numeral 19 represents a feed nut screw-threaded into the cap 17 at 20 as shown. The drill spindle 5 is carried by the shell 1 in a bearing at 21, and in the body cap in bearing 22. As there is a thrust from the right to the left as seen in Fig. 1, on the drill spindle 5, a thrust bearing 23 with balls 24 as shown is provided and also a second thrust washer 25 to counteract the thrust of the drill spindle. The said spindle 5 has a concavity 26 terminating in a flattened portion 27 to receive the tapered shank of an ordinary drill (not shown). It is seen that if the nut shaped head 15 of the feed screw 8 is operated that the end 14 of same will disengage a drill in the cavity 26; and also when the feed bar is in closed position as shown in Fig. 1 and the end 16 placed against a rigid abutment (not shown) that in this case when feed screw 8 is operated to the left by using a wrench to turn the head 15 of same the device 28 as a whole is thereby advanced through the material in which the drill in the cavity 26 is operating. The device is provided with an inlet handle 29 having a passage 31, a valve 32 and a second passage 33, emptying into a smaller passage 34. The valve 32 is operated by manually depressing the plunger 45, which depresses in turn the valve head 46 from its seat allowing the air under a pressure "head" entering through passage 31 to pass into passage 33. The plunger 45 has a beveled valve seat and complementary beveled head at 47, 48 respectively so that when the valve 32 is open with head 46 depressed from its seat no leakage can occur at 49. It is readily appreciated that as soon as the manual pressure on plunger 45 is released that the air pressure in passage 31 closes the valve 32 and shuts off the pressure supply of air to the tool itself. The outlet air handle 30 has an internal passage 35 as shown. Both handles are screw threaded preferably into the interior parts of the device as shown.

Within the shell 1 is a solid metal central housing 36, which is of shape shown in Figs. 1 and 3 of the drawings, the two end portions 37, 38 of same being connected by the parts 39, 40. The cross-sectional shape of part of 39 is shown in Fig. 3 dotted, as also the cross-section of part 40, illustrated by the numerals 41 to 44 inclusive, in said Fig. 3. The handle 30 is mounted in block 40, and it is seen that the handles 29, and 30 by passing through the shell 1, prevent the rotation or movement of the central housing 36 within the said shell. Loose on the drill spindle 5 is a driving gear 50, having a collar like extension or hub 51, on which is rigidly mounted the turbine wheel 52 at point 53. This gear 50 and turbine wheel 52, are revolubly mounted on the drill spindle 5 at 54; 55 representing a Babbitt-metal bushing or bearing for said gear 30.

The turbine wheel 52 has a series of circumferentially positioned "pockets" 56 by means of which the air under pressure passing through passages 34, 57, drives or revolves the wheel 52, thereby rotating gear 50 on the spindle 5. It is noted in passing that there is a circumferential groove 58 formed in handle 29 so that there is always free air communication between passages 34 and 57 as is readily understood. The gear 50 is secured on spindle 5 by means of the shoulder 59 and the two lock nuts 60, 61. The gear 50 drives a smaller gear 62, on the shaft 63, the latter having mounted thereon the worm or hub 64 which engages the worm gear 65 mounted on the shaft 66, the latter being also mounted transversely in the housing 36. On the shaft 66 is rigidly mounted the bevel gear 67, which meshes with the bevel gear 68 on shaft 69; the latter being also longitudinally mounted in the flanges of the central housing 36. On the shaft 69 is rigidly mounted the gear 70 which in turn meshes with the teeth of the internal gear 71. The latter gear 71 is fixed on the drill spindle 5 by means of keys 72. From this description of parts it is seen that when turbine wheel 52 is operated by the air under pressure from inlet passages 31, 57, etc., that the motion is at once transmitted to the end 7 of the drill spindle 5. It is noted that as the air under pressure enters the pockets 56 of turbine wheel 52 that the wheel 52 will operate in a clockwise direction as indicated by the arrow in Fig. 3. These little cupfuls of air are discharged as the wheel 52 rotates into the arc-shaped passage 73 formed in the end portion 37 of the housing 36, the cross-sectional shape of said passage 73 being shown in said Fig. 3. From passage 73 the expelled air passes through the substantially rectangular passage 74 formed in the housing 36, and indicated by dotted lines in the Fig. 3, thence to the cylindrical chamber or outlet passage 35, formed in the handle 30 of the drilling machine.

When it is desired to have a handle on the device as indicated in the Fig. 4 of the drawings, the feed screw 8 is removed, and the handle 75 inserted in the feed nut 19 in its place, so that the operator using the device holds same by the handle 75 and holds the valve 32 open with his hand on the plunger 45 of the handle 29. It is noted that the interior chambers within the machine are filled with oil, thereby lubricating the moving parts and preventing leakage of the air under pressure used to operate the machine.

It is seen also that the outlet handle 30 can be sheared on line 76 for some purposes when found desirable.

By means of my invention due to its superior mechanical arrangement of parts the available power obtained is increased from 5 to 10 fold, over the machines in present use; and whereas the latter ordinarily use from 80 to 100 lbs. air pressure the present invention can operate on from 40 to 50 lbs. of air pressure. The mechanical advantage gained in operating on the turbine principle wherein the turbine wheel is operated by air pressure on its circumference it is thought needs no further demonstration. The compactness of the present invention without the use of the usual compression air cylinders is also claimed to be a distinct advantage. From the above description it is seen that I have provided a new device which is a distinct departure in this art possessing the advantages above described.

What I claim is:

1. In a drilling machine, an outer shell, a drill spindle rotatably mounted therein, a turbine mounted on the drill spindle, an internal gear on the drill spindle, and means for transmitting power from the turbine to the internal gear to drive said drill spindle.

2. In a drilling machine an outer shell, a drill spindle mounted therein, a turbine on the drill spindle, a feed screw operating within the drill spindle, an internal gear on the said spindle, and means for transmitting power from the turbine to the internal gear aforesaid.

3. In a drilling machine, an outer shell, a drill spindle rotatably mounted therein, a turbine and driving gear mounted on the drill spindle, an internal housing, a worm mounted in the same, a worm gear meshing with the said worm, means for transmitting power from the driving gear to the worm, an internal gear on the drive spindle, and means for operating the internal gear and drill spindle with power obtained from the aforesaid worm gear.

4. In a drilling machine, an inclosing shell, a drill spindle rotatably mounted in the same, a turbine revolubly carried on the drill spindle, a fluid pressure inlet tube having a primary valve head and seat, a valve seat in the outer wall of said inlet tube, a valve head on the valve plunger stem forming with the last mentioned valve seat, a secondary valve for operating alternately with the primary valve, an internal gear rigidly mounted on the drill spindle, and means for transmitting power from the turbine to the internal gear and rotatably operate same.

5. In a drilling machine a valve having an inlet pressure passage, and an outlet passage, a valve head and seat connecting said passages, a valve plunger head and seat forming a secondary valve, to prevent leakage when the first mentioned valve and seat are in an open position.

6. In a drilling machine, a fluid pressure inlet comprising a primary valve for controlling the fluid supply, a valve head on the primary valve stem forming with its complementary valve seat a secondary valve coacting alternately with the primary valve to prevent leakage when the latter valve is in an open position.

In testimony whereof I affix my signature.

ARTHUR A. KLEIN.

Witnesses:
WILLIAM A. HIRTLE,
WALDO P. BREEDEN.